Sept. 9, 1969                R. N. CLARK ETAL                3,466,497
                        COAXIAL CIRCUIT FOR VACUUM TUBES
Filed Nov. 23, 1966                                         6 Sheets-Sheet 3

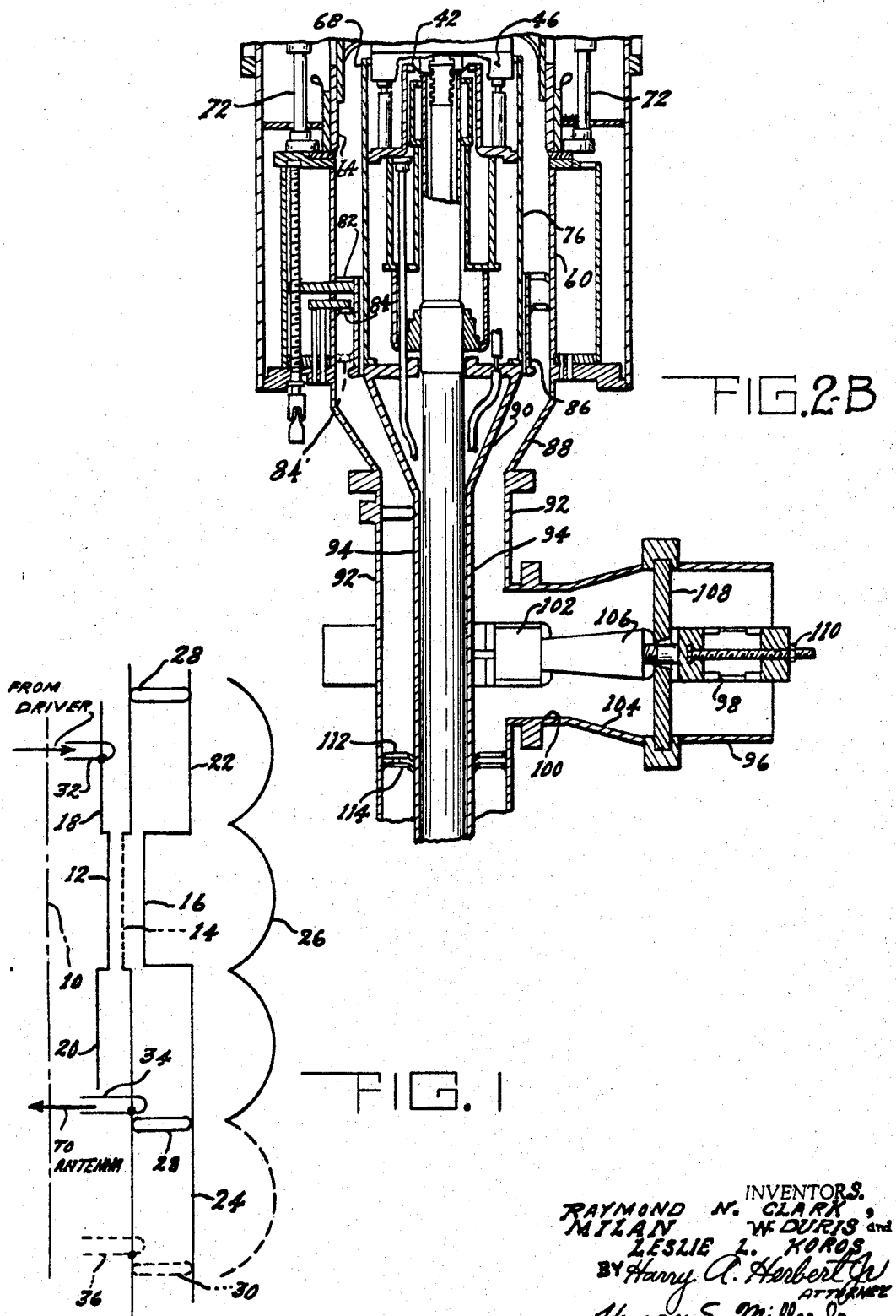

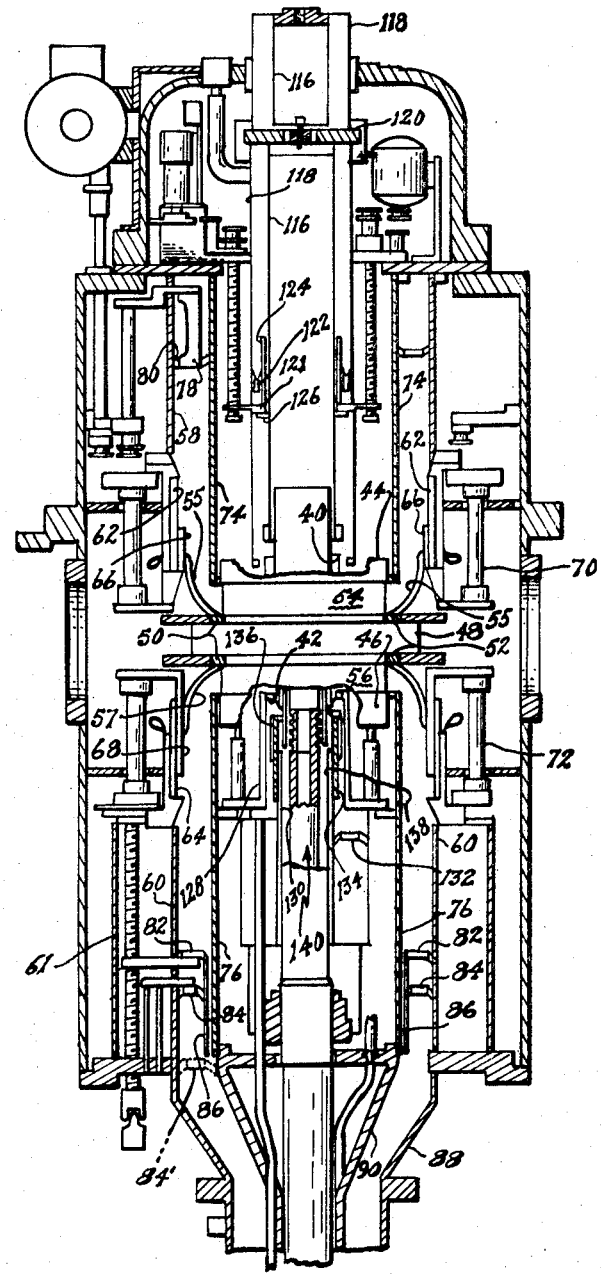
FIG.2-A

INVENTORS.
RAYMOND N. CLARK,
MILAN W. DURIS and
LESLIE L. KOROS,
BY Harry A. Herbert Jr.
                ATTORNEY
Henry S. Miller Jr.
                AGENT Sept. 9, 1969 R. N. CLARK ETAL 3,466,497
COAXIAL CIRCUIT FOR VACUUM TUBES
Filed Nov. 23, 1966 6 Sheets-Sheet 4
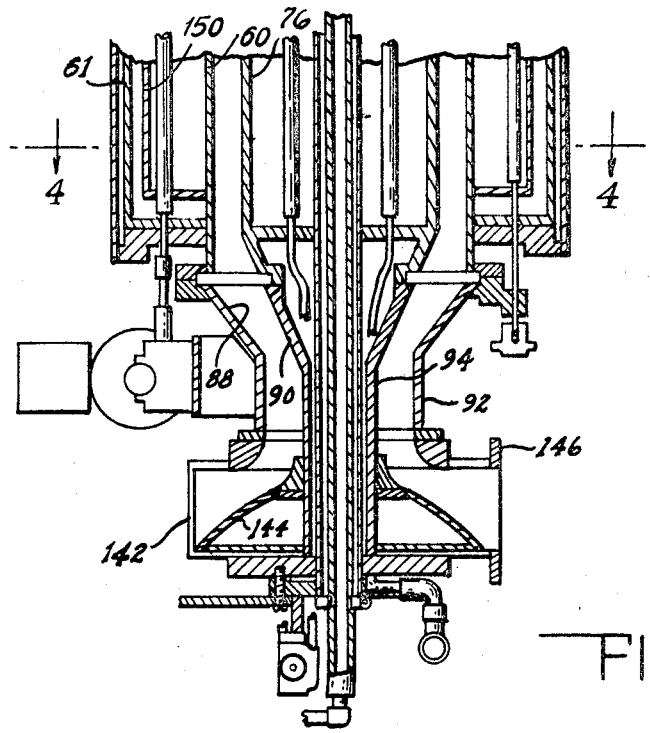
FIG.3-B
INVENTORS
RAYMOND N. CLARK,
MILAN W. DURIS and
LESLIE L. KOROS
BY Harry A. Herbert Jr.
ATTORNEY
Henry S. Miller Jr.
AGENT

United States Patent Office 3,466,497
Patented Sept. 9, 1969

3,466,497
COAXIAL CIRCUIT FOR VACUUM TUBES
Raymond N. Clark, Cherry Hill, N.J., Milan W. Duris, Bethel Park, Pa., and Leslie L. Koros, deceased, late of Haddonfield, Camden, N.J., assignors to the United States of America as represented by the Secretary of the Air Force
Filed Nov. 23, 1966, Ser. No. 600,345
(Filed under Rule 47(a) and 35 U.S.C. 116)
Int. Cl. H01j *19/80*
U.S. Cl. 315—39                3 Claims

ABSTRACT OF THE DISCLOSURE

An input and output network for high power vacuum tubes which minimizes the effect of TE modes including a main cavity, a back cavity outside and around the main cavity, coupling slots in the main cavity parallel to the cavity axis, reactive flat line elements in the back cavity for shifting TE mode resonances, where the tuning and loading is accomplished by a coaxial line element in sliding short circulated contact with the outer conductor at one end and open circulated at the other.

---

This invention relates generally to vacuum tubes, and more particularly to a coaxial input and output network for super power vacuum tubes.

When utilizing a super power tube in a UHF band, certain problems arise when these tubes are operated at an average power of about 300 kilowatts to a peak of 5 megawatts. One of these problems is the effect of the circumferential (TE) moding resonances which ordinarily make it impossible to get continuous coverage over a frequency band. Although described in terms of super power tubes, the fundamental concepts of this invention are useful at any power level and at any frequency when the size of the tube and circuit are large compared with the wavelength, thus causing TE moding resonances of the tube and cavity to fall within the transmitted band.

Where super power tubes are grid controlled, the tubes, in many cases, are of such a diameter that the cavity built around the tube falls within the circumferential moding region. The tube diameter is determined by the necessary cathode surface to obtain proper emission and by the anode surface which is necessary to withstand the heating effect of the plate current without being damaged by overheating. Efficient water cooling of the anode helps to reduce the tube diameter, but when the average output power of several hundred kilowatts must be obtained at ultra-high frequencies, the tube dimensions are forcibly increased and they reach the moding dimensions. At the lower end of the ultra-high frequency band the tube may not be in the moding region, but the surrounding cavity which is of bigger diameter will, in many cases, be in the moding region.

The average diameter of the tube and cavity is the most important factor to determine whether or not the tube and cavity combination might support TE mode propagation.

The TE mode cannot exist in a coaxial cavity if the tube and cavity diameters are below a certain dimension in relation to the carrier frequency. Components with diameters greater than the theoretical maximum will support TE propagation, but they must not necessarily show TE type cavity resonances. If the tube and cavity combination is above the theoretical cut-off dimensions but is electrically short, the first TE resonance will be found at a higher frequency than is predicted by considering the diameter alone. We have found that the resonance moding frequencies in the tube-cavity combination can be shifted by changing the cavity length. Whereas propagation in the TE mode causes some amount of voltage and current unbalance, it does not necessarily prevent satisfactory operation. A TE-resonance, on the other hand, at or close to the carrier frequency (mode crossing) causes an extraordinary high amplitude unbalance and no high power operation is possible in such condition.

When a half-wave length is added to a resonator the resonance frequency remains unchanged. The electrical half-wave length for a TE mode is not, however, the same physical length as for the TEM mode and thus by changing the cavity length with a TEM half-wave length (free space half-wave length) the TE resonator changes by a length different from an electrical half-wave length, causing the TE resonance frequency to change.

According to the present invention, the length of the resonator will be changed by one or more half-wave lengths when a TE resonance is coincident with or is close to a TEM resonance. As an example, the cavity may operate in a half-wave length TEM mode at most of the frequencies. To avoid mode crossings at some frequencies within the band, another half-wave length will be added and at some other frequencies, two or more half-wave lengths could be added. The same concept will be utilized when the shortest cavity configuration is two or three-half-wave lengths long. A three half-wave length cavity will be changed over into a four half-wave length cavity to avoid a mode crossing.

It is therefore an object of this invention to provide a new input and output network for vacuum tubes.

It is another object of this invention to provide a novel coaxial circuit for super power vacuum tubes.

It is still another object of this invention to provide a coaxial circuit for a vacuum tube which will permit operation in extended frequency regions where TE mode resonances are possible besides TEM resonances.

It is a further object of this invention to provide a coaxial cavity which will minimize the TE mode unbalance.

It is still a further object of this invention to provide a coaxial input or output cavity for electron tubes which can be varied by at least a half-wave length in the TEM mode resonance.

It is another object of this invention to provide in a coaxial cavity, means to avoid mode crossing coincidences at the same carrier frequency.

It is a further object of this invention to provide a cavity structure around a vacuum tube which includes a back cavity concentrically located outside the main cavity.

It is still another object of this invention to provide means for varying the reactances in the circuit.

It is still a further object of this invention to provide a coaxial cavity for vacuum tubes including a sliding contact for cavity turning and loading.

These and other advantages, features and objects of the invention will become more apparent from the following description taken in connection with the illustrative embodiments in the accompanying drawings, wherein:

FIG. 1 is a simplified schematic diagram illustrating the relative position of the tube and its cavities.

FIGS. 2A and 2B are side sectional views of a double ended triode surrounded by a cavity according to this invention.

FIGS. 3A and 3B are side sectional views of a single ended triode surrounded by a cavity according to this invention.

Figure 5:
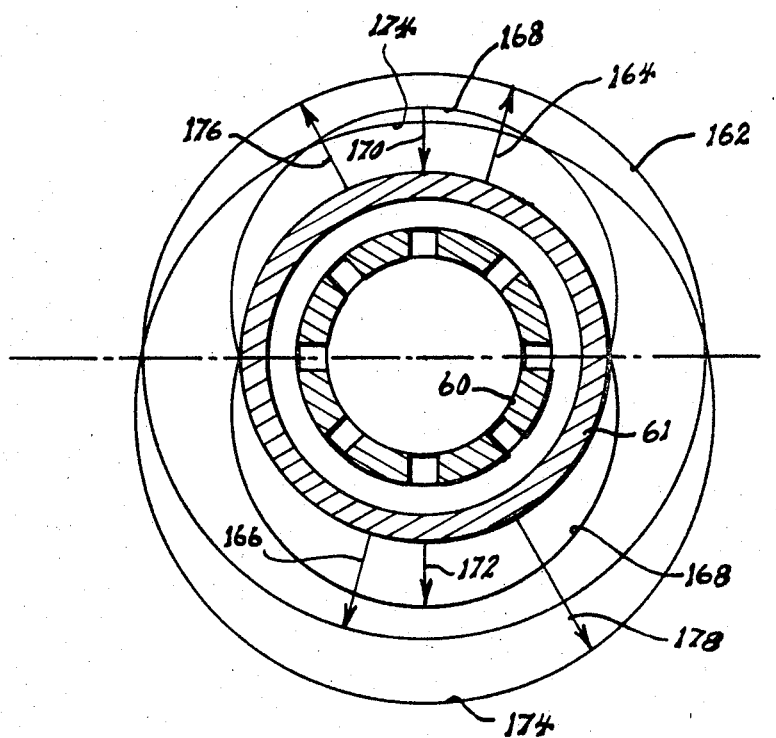

FIG. 5 diagrammatically illustrates the voltage conditions in a cavity plane where the field is built up from TEM and TE mode propagations.

Figure 6:
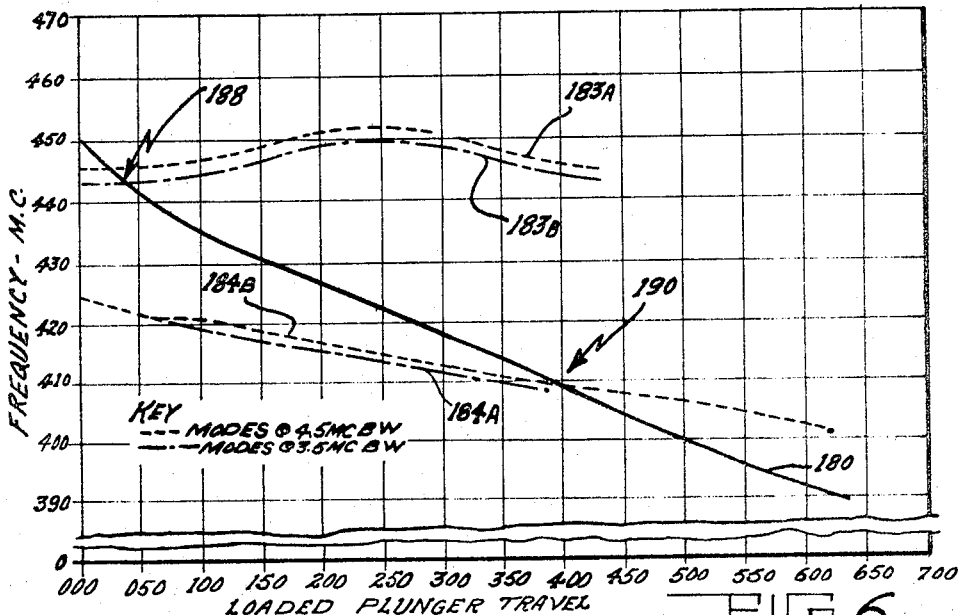

FIG. 6 graphically illustrates typical TEM and TE resonance curves for 5 megawatt peak power output in the three half-wave lengths mode.

Figure 7:
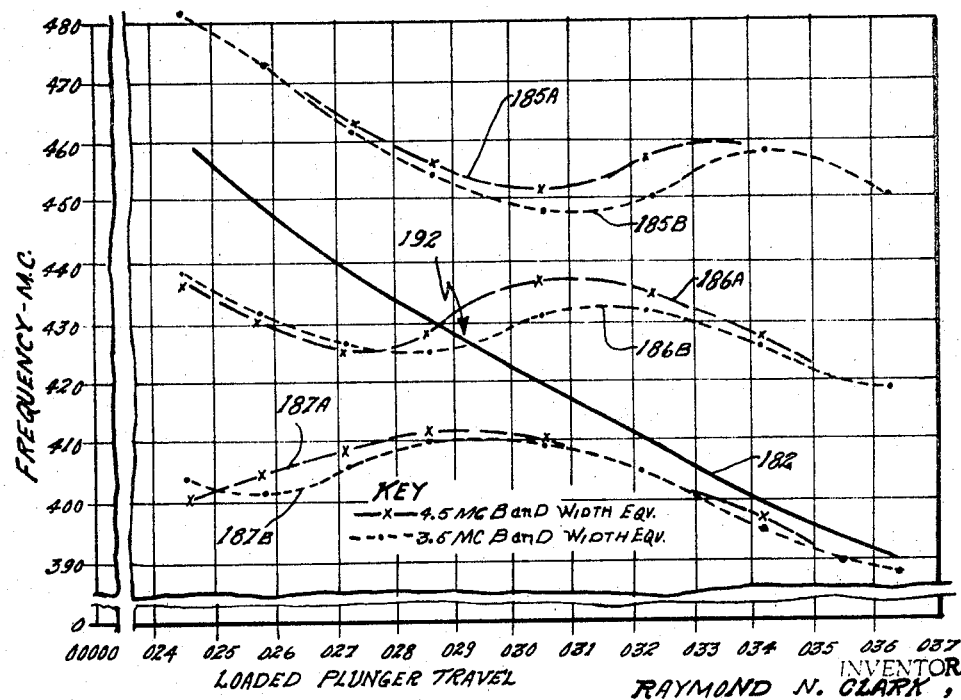

FIG. 7 graphically illustrates typical TEM and TE resonance curves for 5 megawatt peak power output in the four half-wave lengths mode.

Referring now to FIG. 1, there is shown a simplified representation of the relative positions of the tube and cavity components, along with the exciting and loading elements for a double ended triode. The center line of the tube and cavity is at 10 with the cathode at 12. When a super power tube is used, such as the RCA A–2346 double ended triode, the cathode would consist of 96 tungsten filament strands, distributed on a cylindrical surface; in this case then the center line 10 would be the center of the cylinder. The grid structure 14 forms another cylinder which surrounds the filament cylinder, while the plate 16 forms a third cylinder which, in turn, surrounds the grid cylinder.

Four cavity elements are necessary to resonate the tube and obtain power from it, two grid cavities and two plate cavities which are connected to both ends of the tube. The two grid cavities are represented by the cavities 18 and 20 and are constructed from concentric cylindrical tubings. The grid cavities contact the annular cathode and grid terminals of the tube. Plate cavities 22 and 24 are formed by two coaxial tubings and are connected between the coaxial plate and grid terminals. A sliding short-circuiting plunger terminates each grid cavity; the plungers in turn determine the length of the resonator. The voltage standing wave ratio pattern 26 shows a three half-wave length resonance with the short-circuiting plunger in position 28 and a four half-wave length resonance with the plunger in position 30.

The amplifier operates in three wave length mode at one group of carrier frequencies, and in four wave length mode at other frequencies; however, the input or grid-cathode cavity is tuned in three half-wave length mode at all frequencies. The coupling loop 32 is utilized to excite the input resonating circuit which is composed of the tube and two cavities. Coupling loops 34 and 36 take power from the plate cavity.

It is to be understood that FIG. 1 is a simplified representation of this invention used to explain the principles of operation, while some components are in fact different from those shown; for example, the coupling loops 32, 34 and 36 utilize transmission line type exciting and loading elements in the tube of the invention.

In FIGS. 2A and 2B there is shown generally a double ended triode surrounded by the cavity of this invention, although it should be noted that this invention is not limited to double ended triodes. Cathode grid connections are shown at 40 and 42 while the input tube grid connections are at 44 and 46. The external part of the plate 48 is connected to the cavity through circular contact rings 50 and 52 and sealed by the cylindrical ceramic tube seals 54 and 56, located between the plate and grid connecting electrodes. The curved members 55 and 57 are part of the upper and lower plate resonators. The external conductors of the plate cavities 58 and 60 are connected to the ceramic cylinders 62 and 64 which serve as a dielectric in a coaxial D-C blocking condenser.

Although ceramic materials are used as dielectrics, this invention is not limited thereto. Other materials, having proper low-loss characteristics, including air, may be utilized. The electrode 66 is utilized in conjunction with the conductor 58 and forms the electrodes for the condenser 62 while the electrode 60 and conductor 68 form the electrodes for the condenser 64. Insulators 70 and 72 hold the blocking condenser assembly together while members 74 and 76 are the inner conductors of the plate cavities. Plunger 78 is a short-circuiting plunger which can be moved up or down by means of a remotely operated motor and interconnected drive shafts of standard manufacture.

The electrical length of the coaxial condenser line section should be preferably a quarter-wave length for the band center frequency. The blocking condenser length functions to minimize the radiation of the carrier frequency from the cavity.

The plunger 78 has mounted thereon two rows of contact fingers 80 which assure good contact between the cavity inner conductor 74 and outer conductor 58. The plungers 82 and 84, which are also provided with two rows of contact fingers (unnumbered), are utilized for tuning the cavity. The limit of the high standing wave-ratio portion of the lower plate cavity is shown by the position of plunger 82. The extension of the flat annular plunger 82 is a tubular member designated 86. It is stressed that this particular combination of elements is considered to be an important advance in the state of the art.

The surge impedance of the coaxial line element, formed by members 76 and 86 is considerably less than the surge impedance formed by members 60 and 76. This surge impedance change causes a low voltage plane for the voltage standing wave of the cavity at the plane of plunger 82. The voltage builds up again in the low-impedance line section 76–86, formed by the said members, but the highest voltage in this section will be less than in the cavity between members 60 and 76. It is practical to select the length of the extension 86 to a quarter-wave length at the center frequency of the tuning range, but this is not a requirement to operate the cavity according to this invention.

In theory, the voltage E at the end of a quarter-wave length transformer section becomes $I \times Z$, where I is the current at the plane of the plunger 82 and Z is the surge impedance of the coaxial line section, formed by members 76 and 86. The position of the sliding assembly 82 and 84 in the coaxial cavity (60–76) is different for different carrier frequencies. At any sliding assembly position the voltage E will produce a current in the lower portion of the transmission line section of 60–76 which is below the sliding assembly. In a special case E is exactly the voltage which is necessary to produce the desired power output in a resistor Z′, where Z′ is the surge impedance of the 60–76 transmission line. In this special case the sliding section 84 must be in the lowest position shown as 84′ in the figure. It is supposed that the 60–76 transmission line is terminated without reflection or with a minor reflection in the antenna by proper connecting means, described hereinafter.

In a general case the voltage E is higher than necessary to produce the required output in Z′, then the ring-formed sliding contact 84 should be retracted from the lowest position. A coaxial reactance is formed then by members 60, 84 and 86. This reactance is in series with the line surge impedance, Z′ and the reactane goes to zero when member 84 is moved to position 84′. The power in Z′ will be reduced by the current which flows toward the antenna which produces a voltage drop in the reactance. The power output can be adjusted by moving plunger 84 to the proper position relative to the sliding element 82 and extension 86. When this sliding element is moved for tuning, ring 84 moves with the element remaining in the same relative position as it was before. It should be noted that "loading control" (84) adjustment has only second order effect on the cavity tuning and the loading control position must be only slightly changed when the cavity is tuned within an extended range of carrier frequencies. For ideal conditions, best tube performance can be obtained when the electrical distance of plunger 78 from the tube center is equal to the electrical distance of plunger 82 to the tube center.

The conical R-F transformer section, 88 and 90, as best seen in FIG. 2B, matches the surge impedance of 60–76 transmission line into the reduced diameter transmission line section 92–94. The coaxial output line 96–98 is connected through step and taper sections 100–102 and 104–106, respectively. The step and taper sections are designed to minimize reflection from the output line into the cavity. A Teflon disk 108 supports the output line center conductor 110 and also serves as a gas-stop. The interior parts of the cavity can be pressurized when the cavity handles high R-F power as, for example, high peak-power pulses for radar service or similar applications. The circular sliding assembly shown by 112 and 114 can be adjusted to a quarter-wave length distance to the center line of the horizontal output line section 96–98. In this position, or in a position near to the ideal one, the coaxial line element, formed by 92–94 and element 112–114 shows a very high impedance to the joint of the vertical and horizontal line sections. Consequently, this line element will not introduce reflection in the output powerline. The coaxial output line connection can be replaced by a waveguide or output line section without any change in the operation of the cavity. The circuit will be described hereinafter in connection with FIGS. 3A and 3B.

The grid cavity in FIG. 2A is constructed in a similar way as the plate cavity; the input coupling network is connected to the upper grid cavity section. The input line is formed by members 116 and 118 and passes through the insulating spacer 120 which also acts as a gas-stop when the cavity is pressurized. The assembly 121, 122 and 124, consisting of two plungers and a plunger extension respectively, is used for input cavity tuning and input line matching in the same manner as assembly 82, 84 and 86 is used for plate tuning and loading. An insulator disk 126 is provided to center the sliding assembly 121, 122–124. Members 128 and 130 form the coaxial conductors for one side of the grid cavity, while 132 is a sliding tuning plunger which is pre-set for a given frequency to assure symmetrical tube operations. The ceramic or Teflon cylinder 134 is an insulator pressed between two metal cylinders 136 and 138. In this manner a D-C grid blocking condenser is formed to keep the grid at a negative bias voltage.

The center portion of the lower cavity half, generally indicated by 140, is occupied by two concentric water pipes to carry the cooling water to the internal grid-filament structure of the tube and is utilized for high power operation of the tube.

Figure 3A:
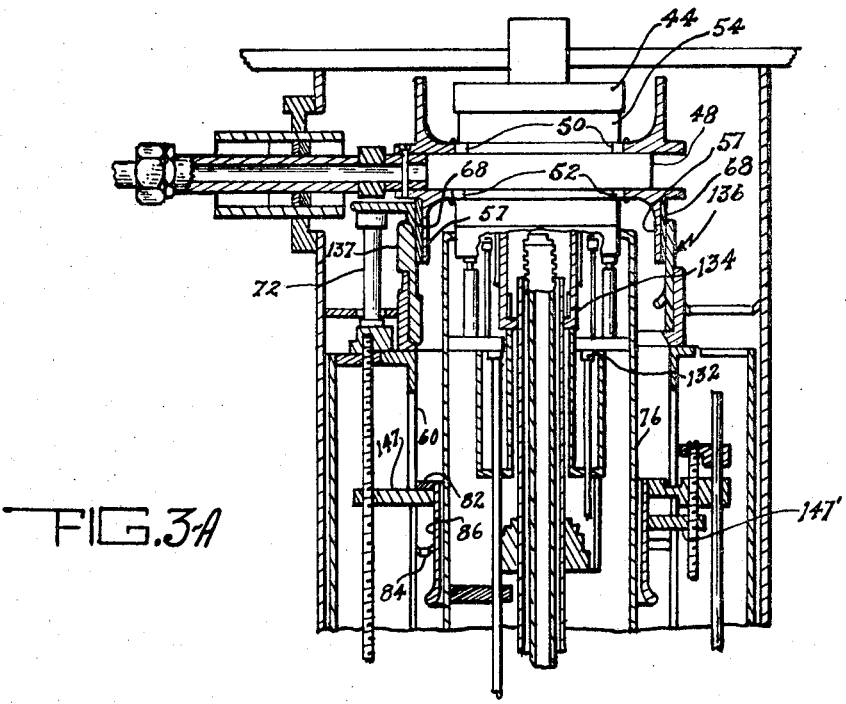

Referring now to FIGS. 3A and 3B, there is shown a triode in which numbered elements between 50 to 94 are the same as those discussed with regard to FIGS. 2A and 2B. It is pointed out, however, that the insulator 136 is shown in two different forms, 136 and 137, either of which is perfectly acceptable for the purposes of this invention.

The transition from the coaxial conductors 92–94 to the waveguide 142 is done with a "door knob" transition 144, while the flange 146 is connected to the waveguide output line, and should be terminated in a substantially matched waveguide transmission line. The taper 144 of the transition member, if properly designed, will assure that the coaxial section 92–94, and consequently the coaxial cavity between the tuning elements 82–84–86 and the output are operating with negligible voltage standing wave ratio. The arm 147 is the moving arm for the tuning element 82–84 and 147' is the moving arm of the loading ring 84.

The waveguide output line with a properly matched door knob transition presents a good termination for the cavity to minimize the TE mode unbalance in the cavity. Theoretically, if the load is uniformly applied around the circumference of a coaxial cavity and no other discontinuities are in the coaxial structure of the tube and cavity, the TE mode propagation is not excited and only TEM mode propagation will be present. The loading applied to one side of a coaxial structure in which the TE mode propagation can be sustained will cause high amplitude TE fields. Whereas the door knob or other type of waveguide termination which uniformly loads the coaxial cavity structure is advantageous, non-uniform load terminations may also be applied. The T junction coaxial output shown in FIG. 2B presents a typical non-uniform loading, but if the vertical coaxial line 92–94 is of smaller diameter and therefore is below TE cutoff, but yet long enough to introduce high attenuation for TE modes, the mode exciting effect of the T junction is minimized, and with the help of the means set forth in this disclosure, perfect high power operation is possible.

Figure 4:
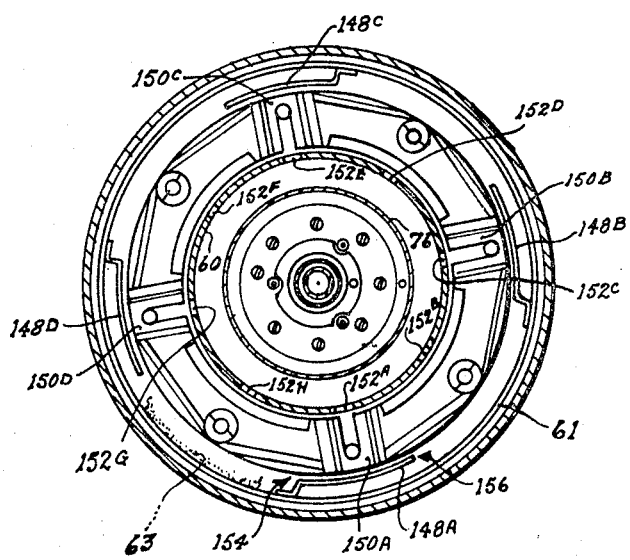
FIG. 4 is a cross-sectional view of the cavity taken along the line 4—4 illustrated in FIGS. 3A and 3B.

FIG. 4 shows a cross-section of the cavity represented in FIGS. 3A and 3B. The section does not show the sliding tuning and loading element 82–84–86. The cavity outer conductor 60 has eight vertical slots, while arms 148 are intruding into the coaxial cavity from the so-called back cavity. These metal arms serve to move the tuning and loading elements. The mechanical components necessary to accomplish the sliding of elements 82–84–86 are in the back cavity. Four 90° spaced arms, similar to 147, and four other 90° spaced arms, similar to 147' (FIG. 3A), are applied in the cavity. The eight arms move up and down, each one in a vertical slot. Four slots are covered from the back cavity by slot covers 150A, 150B, 150C and 150D. The slots 152A through H lengthen the path for some TE mode currents, whereas the effect of the slots for the TEM current can be neglected.

TE mode currents flow parallel to the cavity axis but also flow circumferentially. TEM mode currents flow only parallel to the cavity axis and, consequently, parallel to the slots. Lengthening the paths of TE mode currents into the back cavity changes the TE mode frequencies. Means are applied to shift the TE mode resonant frequencies. Means are applied to shift the TE mode resonant frequencies to a predetermined value by changing the length of the TE mode current paths in the back cavity. The current path lengthening through slots 152A, 152C, 152E and 152G is rather limited because of the enclosures 150A through D. The TE mode-currents enter into the open back cavity through slots 152B, 152D, 152F and 152H. These TE currents excite the coaxial back cavity formed between 60 and back cavity outer conductor 61. The primary exciting currents in the back cavity are injected through 60 by means of slots, current will flow also on the inner side of 61 due to the field build-up in the back cavity. The main cavity TE circuit is now coupled to the reactance of the back cavity and hence the TE resonance is controlled by reactive elements 148A through C which also controls the back cavity current flow. The segments 148A to D are installed on the inner wall of the back cavity outer conductor 61 extending the entire vertical length of the back cavity. Currents flowing circumferentially on 61 must pass through the U-shaped flat transmission line structure. If a TE resonance frequency disturbs the operation in the main cavity, the width of the segment 148A (154 to 156) should be selected close to a quarter-wave length long at the specific frequency. The TE current will see then a very high reactance at the opening 156, and the selected TE frequency will be shifted to another frequency or attenuated up to an undetectable level. Distributing power absorbing material in the back cavity or coating the surface of 61 and/or 148A through 148D the outer surface 60 with resistive material, such as Nichrome, helps to attenuate TE power build-up in the back cavity and, because the back cavity is coupled to the main resonator, the amplitude of the TE field will be attenuated also in the main cavity. Power absorbing material in the back cavity also attenuates harmonics of the carrier and spurious tube oscillations at microwave frequencies. Very short wavelengths propagate in the coaxial cavity in all modes due to random reflections; hence, microwave fields are coupled into the back cavity through the slots and the power absorbing material attenuates them.

The application of the reactances 148A through D in the back cavity is especially advantageous when the TE and TEM resonances for a given resonator geometry are not too far separated, which may occur when the cavity diameter is considerably increased. If, due to the cavity geometry, the wavelength of the TEM and TE modes are close, adding a free-space half-wave length might not shift the mode crossing frequency sufficiently, the action of the reactive elements in the back cavity will cause the TE resonance to be shifted more for the "half-wave length added" condition rather than with normal tuning condition. This effect occurs because the TE coupling between the main resonator and back cavity increased when the slot in the resonator is lengthened. This explains why the combination of proper back cavity components and adding a half-wave length to the cavity helps to cover a large range of frequencies without mode crossing.

FIG. 5 shows the voltage conditions in a cavity plane where the field is built up from TEM and TE mode propagation. The outer and inner conductors of the tube are represented by 158 and 160 respectively. The uniform voltage distribution between 158 and 160 due to the TEM field is shown by 162. The equal voltage vectors in the TEM mode are at 164 and 166, while 168 represents the field distribution in the TE mode, with 170 and 172 being the two TE mode voltage vectors. The TE field distribution is generally uneven, the first order TE mode having two low and two high voltage planes around the circumference of the cavity, the voltage minimum and maximum run parallel to the cavity axis; second order TE modes have four low and four high voltage planes. The direction of the voltage vector is changing by 180° in the cavity, separated by a minimum, as is represented by 170 and 172. The resultant voltage distribution from the TEM and TE fields is represented by 174 which shows that the resultant voltage distribution is uneven in the plane which is perpendicular to the cavity axis. Resultant voltage vectors are shown at 176 and 178.

Because of the 180° phase reversals in the TE fields, the fields from the combined TEM and TE modes are inherently uneven; furthermore, the distortion of the field increases with increasing TE field strength. When the maximum voltage of the TE field is equal to the uniform TEM voltage, the resultant voltage pattern will produce twice the TEM voltage at one side of the cavity and zero voltage on the opposite side. It follows, therefore, that when TE voltages are higher than the TEM voltage, on one side of the cavity the field will be higher than twice the TEM field and two voltage zero points will be observed on the opposite side.

The uneven voltage distribution might cause voltage breakdown; however, currents due to the TEM field are uniformly distributed around the coaxial conductors 158 and 160. The TE current distribution follows the voltage distribution, but the minima and maxima are quarter-wave length, displaced with respect to the voltage pattern; the current pattern will also show current increase and decrease around the circumference of the cavity. The increased current might overheat and destroy components, such as finger contacts which are utilized to assure sliding contacts between stationary and moving components.

FIGS. 6 and 7 show typical TEM and TE resonance curves for a 5 megawatt peak power output, with 300 kilowatt average power, tube cavity combination. The operation in three half-wave lengths mode are presented in FIG. 6, while FIG. 7 presents the operation in the four half-wave lengths mode. The horizontal axis shows the change of position of the 82, 84, 86 tuning and loading unit, while frequency is shown on the vertical axis. The curves 180 and 182 show the TEM resonance frequency as a function of the tuning plunger position. Curves 183A and 183B to 187A and 187B are TE resonance curves which pairwise belong to the same order of TE resonance. All dashed lines represent the tuning plunger position versus TE resonance curves. The resonance curves are shifted from the A to the B (e.g. 184A to 184B) position when loading plunger 84 is moved in the cavity. Two mode crossings are shown on curve 180 at points 188 and 190 or 444 and 410 megacycles. The only mode crossing on curve 182 is at point 192. It should be noted that this mode crossing moves from 426.5 to 429.5 megacycles with loading (bandwidth) changes. This cavity and tube combination can be used to cover approximately the 400 to 460 megacycle region, while curve 180 illustrates the frequency range between 421 and 423 megacycles and curve 182 shows a range between 400 to 421 and 433 to 460 megacycles. The FIGS. 6 and 7 demonstrate, therefore, that without adding a half-wave length resonator length, the frequency coverage of the cavity would be very limited.

The TEM cavity resonances are not used in close vicinity of a mode crossing because the voltage and current unbalance is high. A proper spacing from mode crossing to operating frequency, for example, 8 to 10 megacycles, can be assured with a cavity built according to this invention.

Although the invention has been described with reference to particular embodiment, it will be understood to those skilled in the art that the invention is capable of a variety of alternative embodiments within the spirit and scope of the appended claims.

What is claimed is:
1. A coaxial circuit for high power vacuum tubes comprising: a vacuum tube having a cathode with a generally cylindrical configuration; a plate electrode of cylindrical shape surrounding said cathode and having inner plate conductor and an outer plate conductor forming a cavity; a cylindrically shaped member surrounding the outer plate conductor forming a back cavity; means for communicating between said cavity and said back cavity an elongated annular tuning means placed between said inner plate and said outer plate and adapted to be positioned along the longitudinal axis of the plate; means placed between the elongated tuning means for short circuiting the tuning means and the outer plate and adapted to be moved while in sliding contact with the plate and tuning means whereby the effective length of the mode current paths in the cavity change thereby shifting the TE mode resonant frequencies.

2. A coaxial circuit according to claim 1 wherein said means for communicating includes a plurality of longitudinal slots in the outer plate conductor.

3. A coaxial circuit according to claim 2 wherein the back cavity is coated with a power absorbing material.

References Cited
UNITED STATES PATENTS

| | | | |
|---|---|---|---|
| 2,424,002 | 7/1947 | Sloan | 315—39 |
| 2,446,017 | 7/1948 | McArthur et al. | 315—39 |
| 2,641,734 | 6/1953 | Sloan | 315—39 |
| 2,945,158 | 7/1960 | Garson | 315—39 |
| 2,948,858 | 8/1960 | Stameson | 315—39 X |

HERMAN KARL SAALBACH, Primary Examiner

SAXFIELD CHATMON, Jr., Assistant Examiner

U.S. Cl. X.R.

330—56; 333—83